United States Patent
Choi et al.

(10) Patent No.: US 6,941,123 B2
(45) Date of Patent: Sep. 6, 2005

(54) SIGNAL PROCESSING METHOD AND APPARATUS FOR OBTAINING DIVERSITY GAIN IN WIRELESS COMMUNICATION SYSTEM EQUIPPING ANTENNA ARRAY

(75) Inventors: Jin-Ho Choi, 93-1 Mojin-dong, Gwangjin-gu, Seoul 143-140 (KR); Sung-Soo Ahn, Gyeonggi-do (KR)

(73) Assignees: SAS Technologies Co., Ltd., Seoul (KR); Jin-Ho Choi, Seoul (KR)

( * ) Notice: Subject to any disclaimer, the term of this patent is extended or adjusted under 35 U.S.C. 154(b) by 401 days.

(21) Appl. No.: 10/310,839

(22) Filed: Dec. 6, 2002

(65) Prior Publication Data

US 2003/0125091 A1 Jul. 3, 2003

(30) Foreign Application Priority Data

Dec. 8, 2001 (KR) .................................. 10-2001-77674

(51) Int. Cl.[7] ................................................ H04B 7/10
(52) U.S. Cl. .......................... 455/273; 455/65; 375/347
(58) Field of Search .............................. 455/562.1, 272, 455/273, 278.1, 132, 137, 101, 65, 504; 375/347

(56) References Cited

U.S. PATENT DOCUMENTS

| 6,006,110 | A | * | 12/1999 | Raleigh ....................... 455/561 |
| 6,101,399 | A | * | 8/2000 | Raleigh et al. ............. 455/561 |
| 6,850,741 | B2 | * | 2/2005 | Lei et al. .................... 455/101 |

* cited by examiner

Primary Examiner—Nguyen T. Vo
(74) Attorney, Agent, or Firm—Greenblum & Bernstein, P.L.C.

(57) ABSTRACT

A signal processing method and apparatus for obtaining a diversity gain in the communication system equipping the antenna array when a background noise is a space white noise or a non white noise is disclosed. The signal processing method and apparatus includes steps and functions of calculating a covariance matrix, estimating at least two time invariance vectors by performing an eigen-disintegration operation, estimating a channel vector and outputting a beam-forming vector. The present invention can improve the performance of the antenna array by using at least two time invariance vectors and it also increase a communication quality and quantity of the communication system, if the present invention is implemented to the wireless communication system.

25 Claims, 5 Drawing Sheets

US 6,941,123 B2

SIGNAL PROCESSING METHOD AND APPARATUS FOR OBTAINING DIVERSITY GAIN IN WIRELESS COMMUNICATION SYSTEM EQUIPPING ANTENNA ARRAY

FIELD OF THE INVENTION

The present invention relates to a signal processing method and apparatus in an antenna array and, more particularly to a signal processing method and apparatus for obtaining a diversity gain in a wireless communication system equipping the antenna array in case that a background noise is a spatial white noise or a non white noise.

DESCRIPTION OF RELATED ARTS

An antenna array effectively decreases or eliminates an interference signal by receiving signals selectively. The antenna array assumes that transmission paths of signals inputted to the antenna array are identical because a gap between antenna elements of the antenna array is very narrow. The antenna array selectively receives the signal by forming a beam. By selectively receiving the signal, the antenna array increases not only a capacity of a wireless communication system but also quality of the wireless communication system.

A beam former in the antenna array generally gives proper a weight value to an each antenna and applies a sum of the weight values of antenna array as an output signal to a signal detector. The most important part of the wireless communication antenna is the weight value, which is a necessity to the beam former.

The weight vector is computed so as to obtain a maximum signal-to-noise ratio. If the number of antenna elements in the antenna array is L and a signal received at the L antenna elements can be expressed as following equation 1.

$$y[l]=[y_1[l]y_2[l]\ldots y_L[l]]^T=h[l]s[l]+n[l] \quad \text{Eq. 1}$$

In here, $y_k[l]$ denotes a baseband signal received at $k^{th}$ antenna element and l denotes a $l^{th}$ sampling signal. s[l] is $l^{th}$ signal symbol and h[l] is a channel vector having l elements. $h_k[l]$ is an entire channel gain of $k^{th}$ receiving antenna at a transmitting antenna when transmitting $l^{th}$ signal symbol, wherein $h_k[l]$ is $k^{th}$ element of the channel vector. The noise vector n[l] has l elements and $k^{th}$ element $n_k[l]$ is a baseband background noise of $k^{th}$ receiving antenna at $l^{th}$ symbol time.

In the beam former, if the weight of $k^{th}$ receiving antenna is $w_k[l]$, the weight vector is defined as a following equation 2.

$$w[l]=[w_1[l]w_2[l]\ldots w_L[l]]^T \quad \text{Eq. 2}$$

An output of, the beam former is expressed as a following equation 3.

$$z[l]=w^H[l]y[l]=w^H[l]h[l]s[l]+w^H[l]n[l] \quad \text{Eq. 3}$$

In Eq. 3, the weight vector for obtaining a maximum signal-to-noise ratio is defined as a following equation 4.

$$w_{MSNR}[l]=R_n^{-1}h[l] \quad \text{Eq. 4}$$

In here, $R_n^{-1}$ is the background noise and a covariance matrix of n[l].

The covariance matrix of the noise and the channel vector are estimated for gaining the weight vector. The channel vector can be expressed as a following equation 5 under assumptions such as each gap of antennas in the antenna array is a λ/2 gap, all received signals of each antenna are received through the same transmission path and a delay of arrival time according to antenna array are different.

$$h[l]=\alpha[l]a(\theta) \quad \text{Eq. 5}$$

In here, θ is an arrival angle of the received signal, a(θ) is an array response vector (ARV), which is a characteristic vector of the antenna array and α[l] is a fading factor of the transmission path.

In Eq. 5, a(θ) is a time-invariance vector function having L elements and α[l] is a scalar which is changed according to a time (that is, changed at every symbol). The time-invariance vector function of a(θ) is computed first and the α[l], which is an attenuation value, is computed by using a pilot symbol.

As above-mentioned conventional technique, the channel vector is estimated by computing the time-invariance vector first and calculating the attenuation value which is varied at every symbol. In the conventional technique, the channel vector is estimated under an assumption that received signals of the antennas are received through the same transmission path which tells that received signals have 100% correlation there between there is no diversity gain.

However, in real environment, the signals received at antennas are received through various paths. That is, the signals received by being distributed as much as $\theta_p$, wherein a center angle is θ. Therefore, the channel vector of the real environment is expressed as a following equation 6.

$$h[l]=\sum_{q=1}^{Q}\alpha_q[l]a(\theta+\theta_q) \quad \text{Eq. 6}$$

The total number of received signals is Q and an attenuation of each signal is $\alpha_q[l]$. Generally, $\theta_q$ is small enough to be assumed as 0.

Therefore, the attenuation $\alpha_q[l]$ is expressed as a following equation 7.

$$\alpha[l]=\sum_{q=1}^{Q}\alpha_q[l] \quad \text{Eq. 7}$$

As mentioned above, in the conventional signal processing technique, the diversity gain is obtained due to the assumption that $\theta_q$ is 0 and the diversity gain is 0. If the $\theta_q$ is not small enough to be ignored, in the conventional signal processing technique, the diversity gain cannot be obtained because the conventional signal processing technique uses only one eigenvector corresponding to the maximum eigen value of the covariance matrix of the received vector signal. Therefore, it has been required that a signaling processing technique in which the diversity gain is obtained in the real mobile communication environment.

SUMMARY OF THE INVENTION

It is, therefore, an object of the present invention to provide a signal processing method for obtaining a diversity gain in a communication system equipping an antenna array by using at least two eigenvectors corresponding to eigenvalues of a covariance matrix of a received vector signal, which are chosen orderly from the largest eigenvalue when a background noise is either non-white noise or a spatial white noise.

It is, therefore, another object of the present invention to provide a signal processing apparatus obtaining a diversity gain in a communication system equipping an antenna array, by using at least two eigenvectors corresponding to eigenvalues of a covariance matrix of a received vector signal, which are chosen orderly from a largest eigenvalues when a background noise is either non-white noise or a spatial white noise.

It is, therefore, still another object of the present invention to provide a computer readable record medium storing instructions for executing signal processing method obtaining a diversity gain in a communication system equipping an antenna array by using at least two eigenvectors corresponding to eigenvalues of a covariance matrix of a received vector signal, which are chosen orderly from the largest eigenvalue when a background noise is either non-white noise or a spatial white noise.

In accordance with an aspect of the present invention, there is provided a signal processing method for obtaining a diversity gain in a communication system equipping an antenna array when a background noise is a spatial white noise vector, including the steps of: a) computing a covariance matrix of an input signal vector; b) performing a eigen-division of the covariance matrix and estimating a time invariance vector forming a signal sub-space according to a matrix rank (r) of the covariance matrix by selecting at least two eigenvectors having comparatively larger eigenvalue; and c) estimating a channel vector by receiving the time invariance vector from the step b) and a channel coefficient computed by using a pre-known symbol.

In accordance with another aspect of the present invention, there is provided a signal processing method for obtaining a diversity gain in a communication system equipping an antenna array when a background noise is a spatial white noise vector, including the steps of: a) calculating a covariance matrix of an input signal vector defined according to an equation as $$\hat{R}_y = \frac{1}{N}\sum_{l=0}^{N-1} y[l]y^H[l],$$

wherein N is a smoothing factor; b) performing a eigen-division of the covariance matrix and estimating plural number (r) of time invariance vectors ($\{e_m\}$); c) calculating an instance coefficient $\hat{h}_m[l]$ of a pre-known pilot signal s[l] by accumulating an eigenvector and an input signal vector according to an equation as $\hat{h}_m[l]=\hat{e}_m^H \underline{y[l]}s^*[l]$ (m=1.2, ,r) and estimating the channel coefficients $\overline{h_m}[l]$(m=1,2, . . . ,r) in a channel coefficient estimating unit by using the instant coefficient, wherein y[l] is the pilot vector and s[l] is a pilot signal; and d) estimating a channel vector by using the channel coefficient computed in the step c) and the eigenvector corresponding to the eigenvalue of the input signal vector based on an equation as $$\hat{h}[l] = \sum_{k=1}^{r} \overline{h_k}[l]\hat{e}_k.$$

In accordance with still another aspect of the present invention, there is provided a signal processing method for obtaining a diversity gain in a communication system equipping an antenna array when a background noise is a non-white noise, including the steps of: a) transforming the non-white noise of an input signal to a white noise; b) calculating a covariance matrix of the white noise; c) performing an eigen-division of the covariance matrix and estimating a time invariance vector forming a signal sub-space according to a matrix rank (r) of the covariance by selecting at least two eigenvectors, which have comparatively larger value, among the eigenvectors corresponding each eigenvalue of the covariance matrix; and d) estimating a channel vector by receiving the time invariance vector from the step b) and a channel coefficient computed by using a pre-known symbol.

In accordance with still another aspect of the present invention, there is provided a signal processing method for obtaining a diversity gain in a communication system equipping an antenna array when a background noise is a non-white noise vector, including the steps of: a) estimating the covariance matrix of the non-white noise of an input signal, performing a matrix factorization and transforming to a white noise after performing the matrix factorization based on an equation as $z[l]=(V^H)^{-1}y[l]$; b) calculating the covariance matrix based on z[l] according to an equation as $$\hat{R}_z = \frac{1}{N}\sum_{l=0}^{N-1} z[l]z^H[l];$$

performing an eigen-division of the covariance matrix and estimating plural number (r) of time invariance vectors $\hat{u}_m$ (m=1,2, . . . ,L,)forming a signal sub-space based on a matrix rank (r); d) calculating an instant coefficient by accumulating the eigenvector of the pre-known pilot signal s[l] and the input signal vector according to an equation as $\hat{g}_m[l]=u_m^H z[l]s^*[l]$ (m=1,2, . . . ,r), wherein s[l] is the pilot signal and z[l] is the input signal vector, which is transformed to the white noise; e) estimating a channel coefficient $\overline{g_m}[l]$ m=1,2, . . . ,r, based on the instant coefficient; and f) estimating a channel vector by using the channel coefficient $\overline{g_m}[l]$ (m=1,2, . . . ,r) computed in the step c) and the eigenvector $\hat{u}_m$ (m=1,2, . . . ,L) corresponding to the eigenvalue of the input signal vector, which is transformed to the white noise based on an equation as $$\hat{g}[l] = \sum_{m=1}^{r} \overline{g_m}[l]\hat{u}_m.$$

In accordance with still another aspect of the present invention, there is provided a signal processing apparatus for obtaining a diversity gain in a communication system equipping an antenna array when a background noise is a spatial white noise vector, including: a) covariance matrix estimating unit for obtaining an input signal vector by sampling a baseband signal of an input signal, which is received through a plurality of antenna elements, and calculating a covariance matrix of the input signal vector; b) eigenvalue division unit for performing an eigen-division of the covariance matrix; c) eigenvector estimating unit for estimating a time invariance vector forming a signal sub-space according to a matrix rank (r) of the covariance matrix by selecting at least two eigenvectors having comparatively larger eigenvalues; d) channel vector estimating unit for estimating a channel vector by receiving the time invariance vector and the channel coefficient computed by using the pre-known symbol; and e) calculating unit for outputting, a beam-forming vector by adding weight values of the channel vector.

In accordance with still another aspect of the present invention, there is also provided a signal processing apparatus for obtaining a diversity gain in a communication system equipping an antenna array when a background noise is a non-white noise vector, including: a) covariance matrix estimating unit for obtaining a input signal vector of a non-white noise by sampling baseband signals of input signals received through a plurality of antenna elements, transforming the non-white noise to a white noise and calculating a covariance matrix of the white noise; b) eigenvalue division unit for performing an eigen-division of the covariance matrix; c) eigenvector estimating unit for estimating a time invariance vector forming a signal subspace according to a matrix rank (r) of the covariance matrix by selecting at least two larger eigenvectors corresponding to each eigenvalue of the covariance matrix; d) channel vector estimating unit for estimating a channel vector by receiving the time invariance vector and the channel coefficient computed by using the pre-known symbol; and e) calculating unit for outputting a beam-forming vector by adding weight values of the channel vector.

In accordance with still another aspect of the present invention, there is also provided a computer readable recording medium storing instructions for executing the signal processing method in case of that a background noise is a space white noise vector, including the functions of: a) computing a covariance matrix of an input signal vector; b) performing a eigen-division of the covariance matrix and estimating a time invariance vector forming a signal subspace according to a matrix rank (r) of the covariance by selecting at least two eigenvectors, which have comparatively larger value, among the eigenvalues corresponding eigenvectors of the covariance matrix; c) estimating a channel vector by receiving the time invariance vector from the step b) and a channel coefficient computed by using a pre-known symbol; and d) outputting a beam-forming vector by adding weights of the channel vectors from the step c).

In accordance with an aspect of the present invention, there is provided a computer readable recording medium storing instructions for executing the signal processing method in case of that a background noise is a non-white noise vector, including the functions of: a) transforming the non-white noise of an input signal to a white noise; b) calculating a covariance matrix of the white noise; c) performing a eigen-division of the covariance matrix and estimating time invariance vectors forming a signal subspace according to a matrix rank(r) of the covariance by selecting at least two eigenvectors, which have comparatively larger value, among the eigenvalues corresponding eigenvectors of the covariance matrix; and d) estimating a channel vector by receiving the time invariance vector from the step b) and a channel coefficient computed by using a pre-known symbol.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE INVENTION

Other objects and aspects of the invention will become apparent from the following description of the embodiments with reference to the accompanying drawings, which is set forth hereinafter.

A technique for estimating a channel vector is explained in detail hereinafter. The technique obtains a diversity gain by using at least two eigenvectors corresponding to two maximum eigenvalues.

Figure 1:
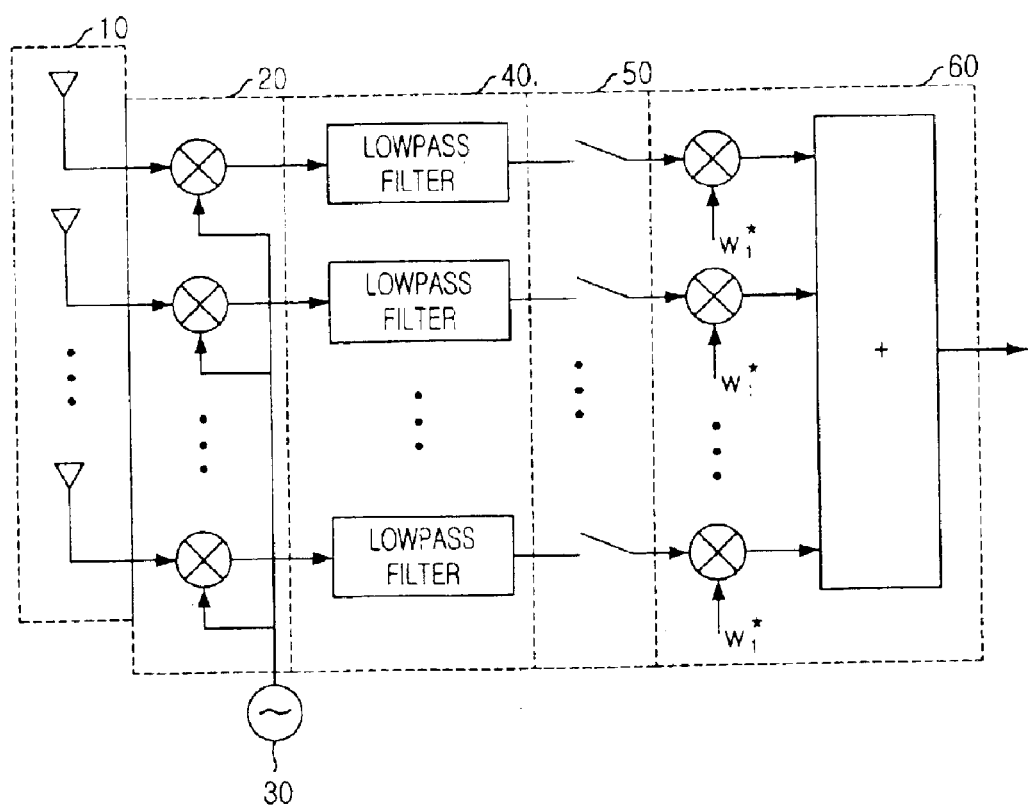
FIG. 1 is a block diagram illustrating a receiving system equipping an antenna array in accordance with a preferred embodiment of the present invention.

FIG. 1 is a block diagram illustrating a receiving system equipping an antenna array according to preferred embodiment of the present invention.

Referring to the FIG. 1 the receiving system includes an antenna array unit 10, a demodulating unit 20, a local oscillator 30, a low pass filtering unit 40, a sampling unit 50 and a beam former 60.

The antenna array unit 10 equips a plurality of antenna elements and receives input signals through antenna elements of the antenna array unit 10. The demodulating unit 20 demodulates the input signals by using a carrier signal provided from the local oscillator 30 and outputs demodulated signals. The low pass filtering unit 40 filters the demodulated signals and outputs filtered signals. The sampling unit 50 performs a sampling process on the filtered signals and outputs sampled signals. The beam former 60 outputs a beam-forming vector by multiplying the sampled signals with corresponding weight vectors.

That is, in the present invention, the carrier signals are multiplied by the input signals for demodulation. After demodulating the input signal, the baseband signals as many as the number of antenna elements are obtained by filtering the demodulated signal. The baseband signals are sampled by the sampling unit 50 for processing signals in the digital circuit. The sampled signals are multiplied with the weight vector for computing the beam-forming vector. The beam former 60 is minutely illustrated in FIG. 2.

Figure 2:
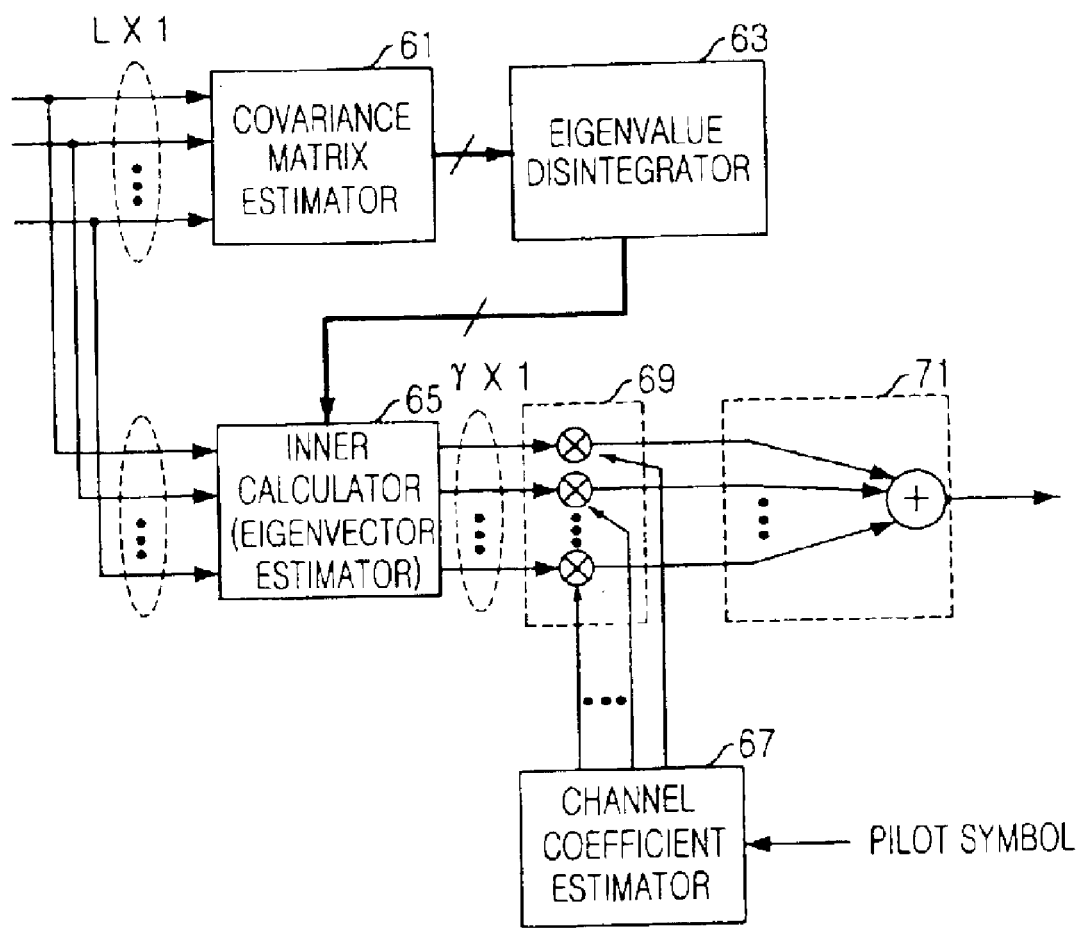
FIG. 2 is a block diagram showing a beam former 60 in FIG. 1 in accordance with a preferred embodiment of the present invention.

FIG. 2 is a block diagram illustrating the beam former 60 in FIG. 1 in accordance with a preferred embodiment of the present invention.

Referring to FIG. 2, the beam former 60 includes a covariance matrix estimator 61, an eigenvalue disintegrator 63, an eigenvector estimator 65, a channel coefficient estimator 67, a channel vector estimator 68 and an eigenvector estimator 71.

The covariance matrix estimator 61 receives an input signal vector. The input signal vector is a vector of the sampled signal outputted from the sampling unit 50. That is, the signal vector is identical with an input vector of the beam former 60 of FIG. 1.

For computing a beam former vector, a covariance matrix of the input signal vector is estimated first. A plurality of eigenvectors is computed by the eigenvalue disintegrator 63. The eigenvalue disintegrator 63 disintegrates the estimated covariance. Finally, the eigenvector is used as a weight vector.

The eigenvector estimator 65 obtains detection signals for synchronous detection by inner producting the weight vector and the input signal vector.

In the channel vector estimator 69, channel coefficients are multiplied for restoring a phase distortion and improving a signal-to-noise ratio, wherein the channel coefficient corresponds to output signals of the eigenvector estimator 65 and it is provided from the channel coefficient estimator 67. The channel vector estimator 69 outputs an estimated channel vector.

The beam-forming vector calculator 71 adds the estimated channel vectors and outputs a sum of the estimated channel vectors for performing the synchronous detection.

As mentioned above, the present invention estimates the channel vectors by obtaining the diversity gain by using a plurality of time invariant vectors (eigenvector) and attenuations corresponding to the time invariant vectors. It is distinguished with the conventional method since the conventional method estimates time invariant vectors and the attenuations varying according to each symbol.

Hereinafter, a signal processing method for obtaining the diversity gain in a receiving system equipping an antenna array according to the present invention is explained in detail by referring FIG. 3A and FIG. 3B.

Embodiment 1

Figure 3A:
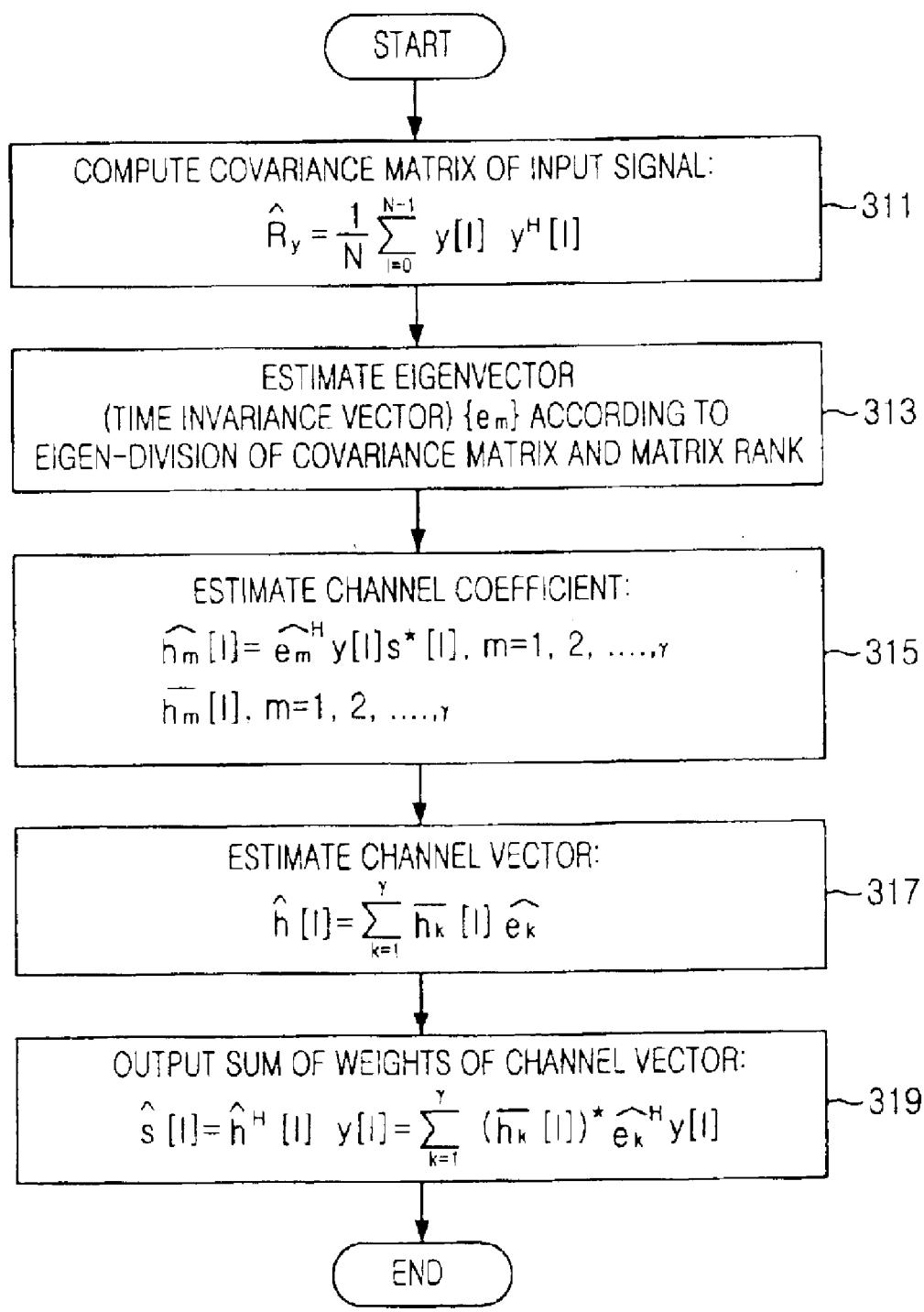
FIG. 3A is a flowchart explaining a signal processing method for obtaining a diversity gain when a background noise is a spatial white noise vector in accordance with a preferred embodiment of the present invention.

FIG. 3A is a flow chart of a signal processing method for obtaining the diversity gain when a background noise is a spatial white noise vector in accordance with a first embodiment of the present invention.

Referring to FIG. 3A, the first embodiment of the present invention is explained in detail hereinafter.

When the back ground noise is the spatial white noise vector, a covariance matrix of the noise is $E[n[1]n^E[1]]=\sigma^2 I$ and $\sigma^2$ is a variance of the background noise. At this time, the covariance matrix of the input signal vector y[1] is defined as a following equation 8.

$$E[y[l]y^H[l]]=E[h[l]h^H[l]]E[|s[l]|^2]+\sigma^2 I \qquad \text{Eq. 8}$$

Generally, the covariance matrix of a channel vector $E[h[1]h^H[1]]$ has very small matrix rank. If $\theta_q$ is 0, the matrix rank is 1. If not, the matrix rank is greater than 1. Based on this factor, an equation of eigencomposition of the covariance matrix of the input signal vector is expressed as a following equation 9.

$$E[y[l]y^H[l]]=[e_1 e_2 \ldots e_L]\text{diag}(\lambda_1+\sigma^2,\lambda_2+\sigma^2,\ldots,\lambda_L+\sigma^2)[e_1 e_2 \ldots e_L]^H \qquad \text{Eq. 9}$$

In here, $e_k$ is $k^{th}$ eigenvector of the covariance matrix and $(\lambda_k+\sigma^2)$ is the eigenvalue corresponding to $e_k$.

If the matrix rank of the covariance matrix $E[h[1]h^H[1]]$ of the channel vector is r, it can be expressed as a following equation 10.

$$\lambda_1 \geq \lambda_2 \geq \ldots \geq \lambda_r \geq \lambda_r+1= \ldots =\lambda_L=0 \qquad \text{Eq. 10}$$

The eigenvector $\{e_1 \ldots e_r\}$ forms a subspace is called "signal subspace" and the eigenvector except $\{e_1 \ldots e_r\}$ forms a subspace is called "noise subspace".

Based on this factor, the channel vector h[1] can be expressed by a following equation 11.

$$h[l] = \sum_{m=1}^{r} hm[l]e_m \qquad \text{Eq. 11}$$

Wherein, $hm[1]=e_m^H h[1]$, $m=1,2,\ldots,r$.

Finally, the channel vector can be gained by estimating r time invariance vectors $\{e_m\}$ and r time variance channel coefficients $\{h_m[1]\}$.

The signal processing method of the first embodiment of the present invention, which computes the beam-forming vector by gaining the channel vector, can be summarized by followings.

At first, the covariance matrix is computed by using an input signal vector, wherein the covariance matrix is defined as a following equation 12 at the step 311.

$$\hat{R}_y = \frac{1}{N}\sum_{l=0}^{N-1} y[l]y^H[l] \qquad \text{Eq. 12}$$

Wherein, N is a smoothing factor.

And then, an eigencomposition of the covariance matrix is computed and the r time invariance vectors $\{e_m\}$ are estimated, wherein the r time invariance vectors from the signal subspace according to the matrix rank r at the step 313.

If the eigenvalues of the covariance matrix $\hat{R}_y$ are expressed as $\beta_1 \geq \beta_2 \geq \ldots \geq \beta_L$ and if each eigenvector corresponding to the eigenvalues is $\hat{e}_k$, then r eigenvectors are estimated as r time invariant vector. The r eigenvectors are eigenvectors from eigenvector having the largest eigenvalue to eigenvector having $r^{th}$ largest eigenvalue.

In other hand, a channel coefficient $h_m[1]$ corresponding to a pilot symbol s[1], which is pre-known symbol, is estimated at the step 315. An estimated channel coefficient is used as a weight vector. If the received signal vector y[1] is a pilot vector and if the pilot signal is s[1], an instance channel coefficient is gained by accumulating eigenvectors and input signal vectors, wherein the instance channel coefficient is expressed as a following equation 13.

$$\hat{h}_m[l]=\hat{e}_m^H y[l]s^*[l], \ m=1,2,\ldots,r \qquad \text{Eq. 13}$$

In the first preferred embodiment of the present invention, the channel coefficient $h_m[1]$ is used as an input signal to a filter of the channel coefficient estimator 67 in FIG. 2 for estimating a better channel coefficient. The computed channel coefficient is expressed as $\overline{h}_m[1]$, $m=1,2,\ldots,r$ hereinafter.

And then, the channel vector is estimated by using the eigenvector $\hat{e}_k$, which is corresponding to the eigenvalue of the received signal vector $\beta_1 \geq \beta_2 \geq \ldots \geq \beta_L$ and the computed channel coefficient $\overline{h}_m[1]$, $m=1,2,\ldots,r$ at step 317, wherein the channel vector is expressed as a following equation 14. At this time, the channel vector provides a diversity gain.

$$\hat{h}[l] = \sum_{k=1}^{r} \overline{h_k}[l]\hat{e}_k \qquad \text{Eq. 14}$$

The final output signal of the beam former 60 of FIG. 1 is obtained by the above-mentioned steps and the beam-forming vector is obtained from a sum of the weight vectors at step 319 as like as a following equation 15.

$$\hat{s}[l] = \hat{h}^H[l]y[l] = \sum_{k=1}^{r} (\overline{h_k}[l])^* \hat{e}_k^H y[l] \qquad \text{Eq. 15}$$

The eigenvector contains values from the largest value to $r^{th}$ largest value which are eigenvectors corresponding to the eigenvalue of $\hat{R}_y$. The eigenvector is a result of gaining when the background noise is the spatial white noise.

Embodiment 2

Figure 3B:
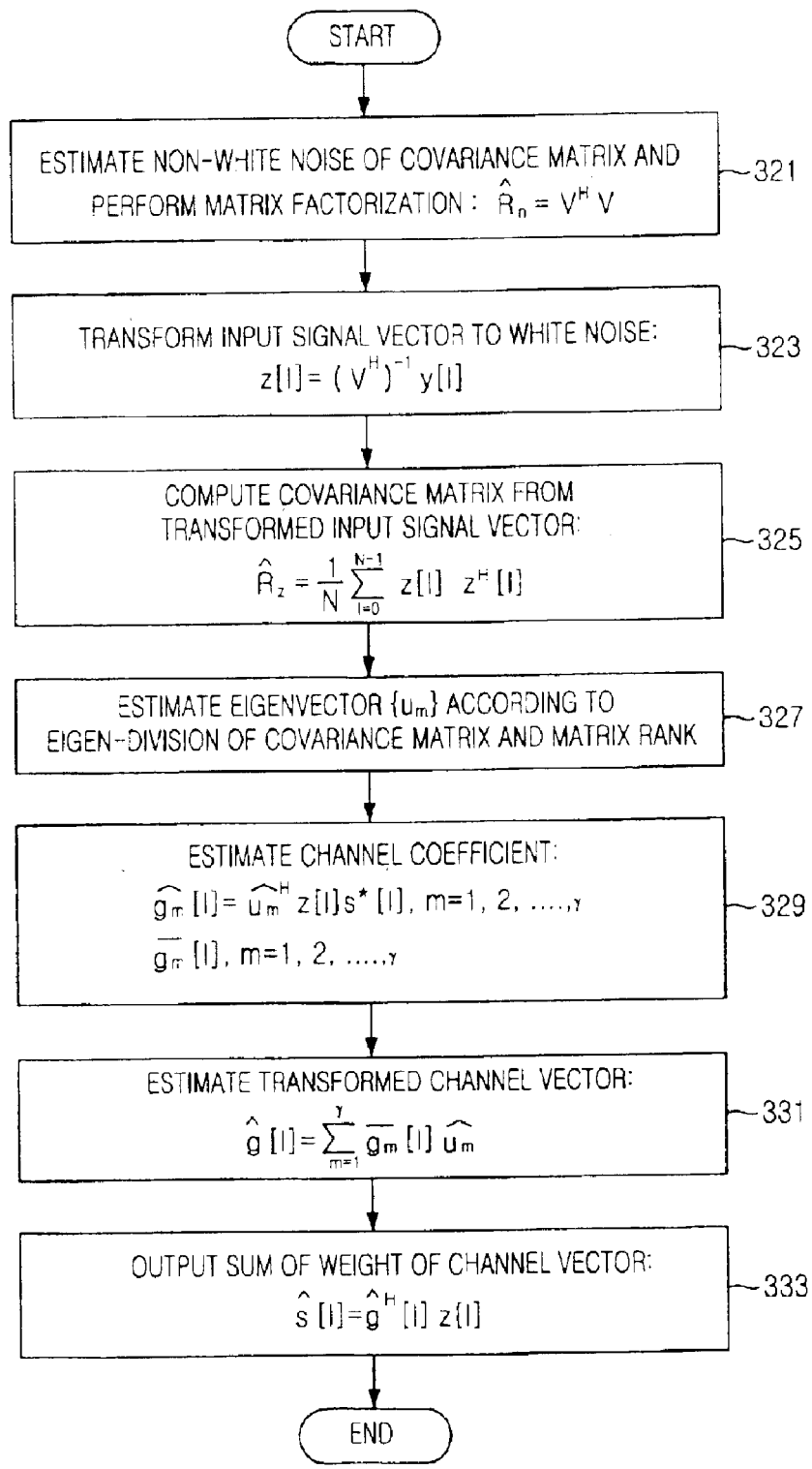
FIG. 3B is a flowchart representing a signal processing method for obtaining a diversity gain when a background noise is a non-white noise vector in accordance with a preferred embodiment of the present invention.

FIG. 3B is a flow chart of a signal processing method for obtaining the diversity gain when a noise vector is not a spatial white noise in accordance with another preferred embodiment of the present invention.

Referring to FIG. 3B, another embodiment of the present invention is explained in detail as followings.

When the noise vector is not the white noise, a channel vector can be estimated by performing a white transforming process before performing the signal processing method of the first preferred embodiment of the present invention.

First of all, a covariance matrix of a non-white noise of a received signal is estimated. And then a matrix factorization is performed as like as a following equation 16.

$$\hat{R}_n = V^H V \qquad \text{Eq. 16}$$

In here, $\hat{R}_n$ is an estimation of the noise covariance matrix, V is the factorized matrix. For an additional reference, in the second preferred embodiment, a cholesky matrix of $\hat{R}_n$ is used for the factorized matrix V, however, the factorized matrix V is computed by other method and it is well known to the skilled ordinary person.

By using the factorized matrix, the white transforming process is performed as a following equation 17.

$$z[l]=(V^H)^{-1}y[l] \quad \text{Eq. 17}$$

Hereinafter, the channel vector can be estimated by the same method of the first preferred embodiment of the present invention by using the transformed input signal vector z[l].

That is, the covariance matrix expressed by a following equation 18 is computed by using the transformed input signal vector z[l] at step 325.

$$\hat{R}_z = \frac{1}{N}\sum_{l=0}^{N-1} z[l]z^H[l] \quad \text{Eq. 18}$$

The eigencomposition of the covariance matrix is performed and r time invariance vectors according to r of the matrix coefficients are estimated at step 327, wherein the r time invariance vectors compose the signal subspace as like in the first preferred embodiment. If the eigenvectors are $\hat{u}_m$, m=1,2, . . . ,L, the signal subspace is formed by r eigenvalues, which are values from the largest eigenvalue to $r^{th}$ largest eigenvalue.

Also, as mentioned above, a transformed channel vector expressed as a following equation 19 can be obtained by using the r eigenvalues at step 331.

$$\hat{g}[l] = \sum_{m=1}^{r} \overline{g_m}\hat{u}_m \quad \text{Eq. 19}$$

In here, $\overline{g_m}[l]$, m=1,2, . . . ,r, is an output of a filter in the channel coefficient estimator in FIG. 2, which has an input as an instant estimation.

For the reference, the instant estimation uses a pre-known symbol such as a pilot symbol. If the received signal vector y[l] is the pilot vector and the pilot signal is s[l], the instant channel coefficient expressed by below equation 20 is gained by using the transformed received signal vector z[l] and the eigenvector 329.

$$\hat{g}_m[l]=u_m^H z[l]s^*[l], \, m=1,2,\ldots,r \quad \text{Eq. 20}$$

In the present invention, the improved channel coefficient estimation is performed by the instant coefficient, which is used as a filter input of the channel coefficient estimator in FIG. 2. The channel coefficients are $\overline{g_m}[l]$, m=1,2, . . . ,r,.

In case of the second preferred embodiment, the addition of weight vector expressed by a following equation 21 is outputted from the beam former finally at step of 333.

$$\hat{s}[l]=\hat{g}^H[l]z[l] \quad \text{Eq. 21}$$

By the above-mentioned steps, the non-white noise is transformed to the white noise by integrating the covariance matrix when the background noise is not the spatial white noise and after transforming, finally the channel vector is estimated by using the transformed input signal vector z[l].

As mentioned above, the present invention implements the beam former that uses at least two eigenvectors in the antenna array of the wireless communication receiver. Therefore, a performance of the antenna array of the wireless communication receiver may be increased.

Figure 4:
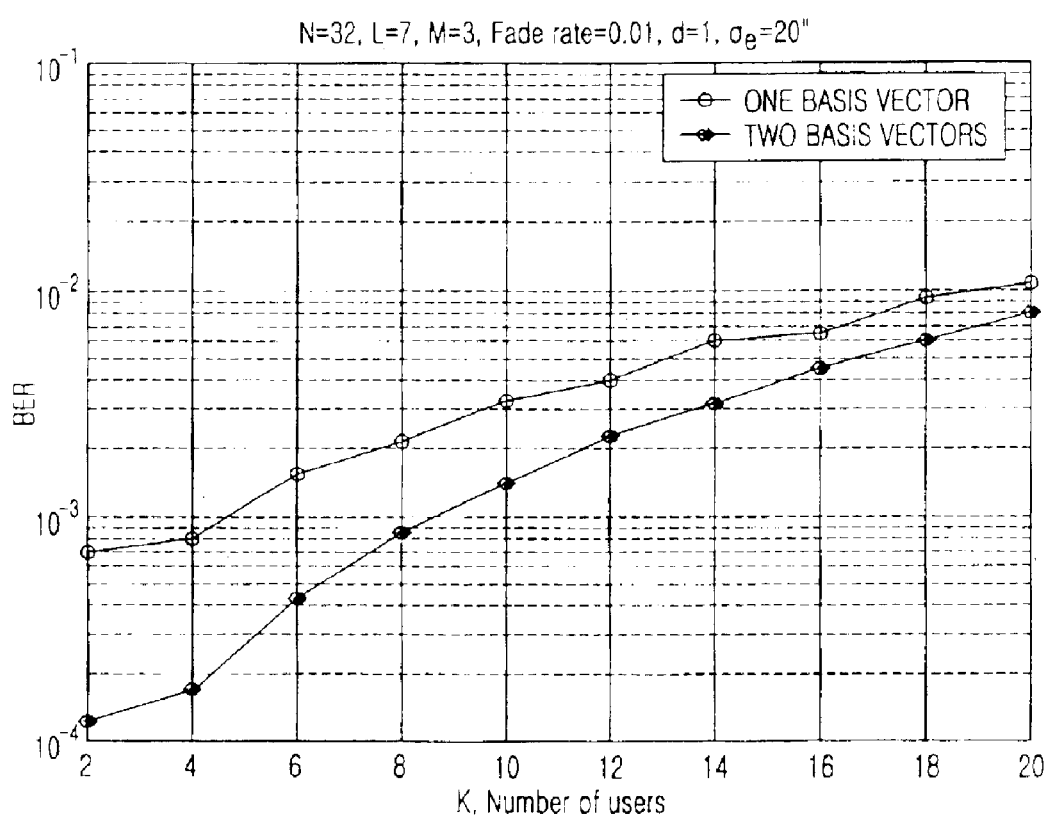
FIG. 4 is a graph depicting a bit error rate of a code division multiple accessing system, at which a signal processing apparatus for forming a beam by using two eigenvectors in accordance with a preferred embodiment of the present invention.

FIG. 4 is a graph showing a bit error rate of the CDMA mobile communication system, which implements the signal processing apparatus for forming the beam by using at least two eigen signal vectors in accordance with the present invention.

Referring to FIG. 4, Y axis is the bit error rate and X axis denotes the number of users accessing the CDMA system. In FIG. 4, the antenna array is composed with 7 antenna elements and a processing gain of the CDMA system is 32. It shows an improvement of performance comparing to the conventional apparatus, which uses one eigenvector. That is, FIG. 4 shows a relationship between the bit error rate and the number of users to access the system. If one bases vector is used, the result is identical to the conventional method, however, if the beam is formed by using at least two basis vectors as like the present invention, the bit error is incredibly decreased. Finally, more users can be accessed to the system under the same bit error rate condition.

The signal processing method of the present invention can be implemented as software and it can be stored in a computer readable record medium such as a RAM, a ROM, a CD-ROM, a hard disk, a floppy disk and an optical magnetic disk.

The present invention can improve the performance of the antenna array by using at least two eigenvectors forming the signal subspace existed in the signal vector and obtaining the diversity gain. It is distinguished with the conventional apparatus in a view of using only one eigenvector. The present invention can increase the number of the users accessing the system such as the CDMA system under the identical bit error rate and also increase a communication quality and communication quantity of the communication system, if the present invention is implemented to the wireless communication system.

While the present invention has been described with respect to certain preferred embodiments, it will be apparent to those skilled in the art that various changes and modifications may be made without departing from the scope of the invention as defined in the following claims.

The present disclosure relates to subject matter contained in priority Korean Patent Application No. 2001-77674, filed on Dec. 8, 2001, the contents of which is herein expressly incorporated by reference in its entirety.

What is claimed is:

1. A signal processing method for obtaining a diversity gain in a communication system equipping an antenna array when a background noise is a spatial white noise vector, comprising the steps of:
   a) computing a covariance matrix of an input signal vector;
   b) performing a eigen-division of the covariance matrix and estimating a time invariance vector forming a signal sub-space according to a matrix rank (r) of the covariance matrix by selecting at least two eigenvectors having comparatively larger eigenvalue; and
   c) estimating a channel vector by receiving the time invariance vector from the step b) and a channel coefficient computed by using a pre-known symbol.

2. The signal processing method in recited as claim 1, further comprising the step of d) outputting a beam-forming vector by adding weight values of the channel vectors from the step c).

3. The signal processing method in recited as claim 2, wherein in the step b), the time invariance vectors are estimated according to matrix coefficient r of the covariance matrix by choosing r eigenvectors from the largest eigenvector to $r^{th}$ largest eigenvector among the eigenvectors corresponding to each eigenvalue of the covariance matrix.

4. The signal processing method in recited as claim 1, wherein the pre-known-symbol used for computing the channel coefficient in the step c) is a pilot symbol s[l].

5. The signal processing method in recited as claim 4, wherein the channel vector in the step c) is computed by accumulating at least two time invariance vectors and a pilot signal vector, herein the pilot signal vector is computed by performing a smoothing process on a time for reducing an affection of noise included in the vector of the pilot signal vector.

6. A signal processing method for obtaining a diversity gain in a communication system equipping an antenna array when a background noise is a spatial white noise vector, comprising the steps of:

a) calculating a covariance matrix of an input signal vector defined according to an equation as $$\hat{R}_y = \frac{1}{N}\sum_{l=0}^{N-1} y[l]y^H[l],$$

wherein N is a smoothing factor;

b) performing a eigen-division of the covariance matrix and estimating plural number (r) of time invariance vectors ($\{e_m\}$);

c) calculating an instance coefficient $\hat{h}_m[l]$ of a pre-known pilot signal s[l] by accumulating an eigenvector and an input signal vector according to an equation as $\hat{h}_m[l] = \hat{e}_m^H y[l]s^*[l]$ (m=1,2, . . . ,r) and estimating the channel coefficients $\overline{h_m}[l]$(m=1,2, . . . ,r) in a channel coefficient estimating means by using the instant coefficient, wherein y[l] is the pilot vector and s[l] is a pilot signal; and d) estimating a channel vector by using the channel coefficient computed in the step c) and the eigenvector corresponding to the eigenvalue of the input signal vector based on an equation as $$\hat{h}[l] = \sum_{k=1}^{r} \overline{h_k}[l]\hat{e}_k.$$

7. The signal processing method as recited in claim 6, further comprising the step of outputting a sum of weight values by using the channel vector computed in the step c) according to an equation as $$\hat{S}[l] = \hat{h}^H[l]y[l] = \sum_{k=1}^{r}(\overline{h_k}[l])^*\hat{e}_k^H\ y[l].$$

8. The signal processing method as recited in claim 6, wherein in the step b), the time invariance vectors are estimated according to matrix coefficient r of the covariance matrix by choosing r largest eigenvectors from the largest eigenvector to $r^{th}$ largest eigenvector among the eigenvectors corresponding to each eigenvalue of the covariance matrix.

9. A signal processing method for obtaining a diversity gain in a communication system equipping an antenna array when a background noise is a non-white noise, comprising the steps of:

a) transforming the non-white noise of an input signal to a white noise;

b) calculating a covariance matrix of the white noise;

c) performing an eigen-division of the covariance matrix and estimating a time invariance vector forming a signal sub-space according to a matrix rank (r) of the covariance by selecting at least two eigenvectors, which have comparatively larger value, among the eigenvectors corresponding each eigenvalue of the covariance matrix; and d) estimating a channel vector by receiving the time invariance vector from the step b) and a channel coefficient computed by using a pre-known symbol.

10. The signal processing method as recited in claim 9, further comprising the step of e) outputting a beam-forming vector by adding weight values of the channel vectors.

11. The signal processing method as recited in claim 10, wherein the step a) includes the steps of:

a1) estimating the covariance matrix of the non-white noise of an input signal;

a2) performing a matrix factorization of the covariance matrix of the non-white noise according to an equation as $\hat{R}_n = V^H V$, wherein $\hat{R}_n$ is the noise covariance matrix and V is a factorized matrix; and a3) transforming the covariance matrix of the non-white noise to the white noise by using the factorized matrix according to an equation as $z[l]=(V^H)^{-1}y[l]$.

12. The signal processing method as recited in claim 10, wherein in the step c), the time invariance vectors are estimated according to a matrix coefficient r of the covariance matrix by choosing r largest eigenvectors (from the largest eigenvector to $r^{th}$ largest eigenvector) among the eigenvectors corresponding to each eigenvalue of the covariance matrix.

13. The signal processing method as recited in claim 12, wherein the channel vector in the step d) is computed by accumulating at least two time invariance vectors and a pilot signal vector, herein the pilot signal vector is computed by performing a smoothing process on a time for reducing an affection of noise included the pilot signal vector.

14. The signal processing method as recited in claim 9, wherein the pre-known symbol used for calculating the channel coefficient in the step d) is a pilot symbol s[l].

15. A signal processing method for obtaining a diversity gain in a communication system equipping an antenna array when a background noise is a non-white noise vector, comprising the steps of:

a) estimating the covariance matrix of the non-white noise of an input signal, performing a matrix factorization and transforming to a white noise after performing the matrix factorization based on an equation as $z[l]=(V^H)^{-1}y[l]$;

b) calculating the covariance matrix based on z[l] according to an equation as $$\hat{R}_z = \frac{1}{N}\sum_{l=0}^{N-1} z[l]z^H[l];$$

c) performing an eigen-division of the covariance matrix and estimating plural number (r) of time invariance vectors $\hat{u}_m$ (m=1,2, . . . ,L,)forming a signal sub-space based on a matrix rank (r);

d) calculating an instant coefficient by accumulating the eigenvector of the pre-known pilot signal s[l] and the input signal vector according to an equation as $\hat{g}_m[l] = u_m^H z[l]s^*[l]$ (m=1,2, . . . ,r), wherein s[l] is the pilot signal and z[l] is the input signal vector, which is transformed to the white noise;

e) estimating a channel coefficient $\overline{g_m}[l]$ (m=1,2, . . . ,r) based on the instant coefficient; and f) estimating a channel vector by using the channel coefficient $\overline{g_m}[l]$ (m=1,2, . . . ,r) computed in the step c) and the eigenvector $\hat{u}_m$ (m=1,2, . . . ,L) corresponding to the eigenvalue of the input signal vector, which is transformed to the white noise based on an equation as $$\hat{g}[l] = \sum_{m=1}^{r} \overline{g_m[l]} \hat{u}_m.$$

16. The signal processing method as recited in claim 15, further comprising the step of f) outputting a sum of weight values by using the channel vector computed in the step e), wherein the sum of weight values is computed by an equation as $\hat{s}[l]=\hat{g}^H[l]z[l]$.

17. The signal processing method as recited in claim 16, wherein the step a) includes the steps of:
   a1) estimating a covariance matrix of the non-white noise of an input signal;
   a2) performing a matrix factorization of the non-white noise of the covariance matrix, wherein the matrix factorization is performed based on an equation as $\hat{R}_n = V^H V$, wherein $\hat{R}_n$ is the noise covariance matrix and V is a factorized matrix; and
   a3) transforming the non-white noise of the covariance matrix to a white noise by using the factorized matrix, wherein the non-white noise of the covariance matrix is transformed according to an equation as $z[l]=(V^H)^{-1}y[l]$.

18. The signal processing method as recited in claim 16, wherein the time invariance vector $\hat{u}_m$ (m=1,2, . . . ,L,) estimated in the step c) are chosen according to matrix coefficient r of the covariance matrix by choosing r largest eigenvectors (from the largest eigenvector to $r^{th}$ largest eigenvector) among the eigenvectors corresponding to each eigenvalue of the covariance matrix.

19. A signal processing apparatus for obtaining a diversity gain in a communication system equipping an antenna array when a background noise is a spatial white noise vector, comprising:
   a) covariance matrix estimating means for obtaining an input signal vector by sampling a baseband signal of an input signal, which is received through a plurality of antenna elements, and calculating a covariance matrix of the input signal vector;
   b) eigenvalue division means for performing an eigen-division of the covariance matrix;
   c) eigenvector estimating means for estimating a time invariance vector forming a signal sub-space according to a matrix rank (r) of the covariance matrix by selecting at least two eigenvectors having comparatively larger eigenvalues;
   d) channel vector estimating means for estimating a channel vector by receiving the time invariance vector and the channel coefficient computed by using the pre-known symbol; and
   e) calculating means for outputting a beam-forming vector by adding weight values of the channel vector.

20. The signal processing apparatus as recited in claim 19, wherein the time invariance vectors estimated according to matrix coefficient r of the covariance matrix by choosing r largest eigenvectors (from the largest eigenvector to $r^{th}$ largest eigenvector) among the eigenvectors corresponding to each eigenvalue of the covariance matrix.

21. A signal processing apparatus for obtaining a diversity gain in a communication system equipping an antenna array when a background noise is a non-white noise vector, comprising:
   a) covariance matrix estimating means for obtaining a input signal vector of a non-white noise by sampling baseband signals of input signals received through a plurality of antenna elements, transforming the non-white noise to a white noise and calculating a covariance matrix of the white noise;
   b) eigenvalue division means for performing an eigen-division of the covariance matrix;
   c) eigenvector estimating means for estimating a time invariance vector forming a signal sub-space according to a matrix rank (r) of the covariance matrix by selecting at least two larger eigenvectors corresponding to each eigenvalue of the covariance matrix;
   d) channel vector estimating means for estimating a channel vector by receiving the time invariance vector and the channel coefficient computed by using the pre-known symbol; and
   e) calculating means for outputting a beam-forming vector by adding weight values of the channel vector.

22. The signal processing apparatus as recited in claim 21, wherein the time invariance vectors estimated in the eigenvector estimating means according to matrix coefficient r of the covariance matrix by choosing r largest eigenvectors from the largest eigenvector to $r^{th}$ largest eigenvector among the eigenvectors corresponding to each eigenvalue of the covariance matrix.

23. The signal processing apparatus as recited in claim 22, wherein in the covariance matrix estimating means, the matrix factorization of the non-white noise of the covariance matrix according to an equation as $\hat{R}_n = V^H V$, wherein $\hat{R}_n$ is the noise covariance matrix and V is a factorized matrix and then transforms the non-white noise of the covariance matrix to the white noise by using the factorized matrix according to an equation as $z[l]=(V^H)^{-1}y[l]$.

24. A computer readable recording medium storing instructions for executing the signal processing method in case of that a background noise is a space white noise vector, comprising the functions of:
   a) computing a covariance matrix of an input signal vector;
   b) performing a eigen-division of the covariance matrix and estimating a time invariance vector forming a signal sub-space according to a matrix rank (r) of the covariance by selecting at least two eigenvectors, which have comparatively larger valued among the eigenvalues corresponding eigenvectors of the covariance matrix;
   c) estimating a channel vector by receiving the time invariance vector from the step b) and a channel coefficient computed by using a pre-known symbol; and
   d) outputting a beam-forming vector by adding weights of the channel vectors from the step c).

25. A computer readable recording medium storing instructions for executing the signal processing method in case of that a background noise is a non-white noise vector, comprising the functions of:
   a) transforming the non-white noise of an input signal to a white noise;
   b) calculating a covariance matrix of the white noise;
   c) performing a eigen-division of the covariance matrix and estimating time invariance vectors forming a signal sub-space according to a matrix rank (r) of the covariance by selecting at least two eigenvectors, which have comparatively larger value, among the eigenvalues corresponding eigenvectors of the covariance matrix; and
   d) estimating a channel vector by receiving the time invariance vector from the step b) and a channel coefficient computed by using a pre-known symbol.

* * * * *

UNITED STATES PATENT AND TRADEMARK OFFICE
CERTIFICATE OF CORRECTION

PATENT NO. : 6,941,123 B2
DATED : September 6, 2005
INVENTOR(S) : J. H. Choi et al.

It is certified that error appears in the above-identified patent and that said Letters Patent is hereby corrected as shown below:

Column 14,
Line 40, "valued" should be -- value, --.

Signed and Sealed this

Eighteenth Day of April, 2006

JON W. DUDAS
*Director of the United States Patent and Trademark Office*